US008162740B2

(12) United States Patent
Aoki

(10) Patent No.: US 8,162,740 B2
(45) Date of Patent: Apr. 24, 2012

(54) WAGERING GAME WITH ASSOCIATED OUTCOMES

(75) Inventor: Dion K. Aoki, Henderson, NV (US)

(73) Assignee: WMS Gaming Inc., Waukegan, IL (US)

( * ) Notice: Subject to any disclaimer, the term of this patent is extended or adjusted under 35 U.S.C. 154(b) by 955 days.

(21) Appl. No.: 11/663,698

(22) PCT Filed: Sep. 21, 2005

(86) PCT No.: PCT/US2005/033839
§ 371 (c)(1),
(2), (4) Date: Mar. 23, 2007

(87) PCT Pub. No.: WO2006/036703
PCT Pub. Date: Apr. 6, 2006

(65) Prior Publication Data

US 2009/0181749 A1 Jul. 16, 2009

Related U.S. Application Data

(60) Provisional application No. 60/613,171, filed on Sep. 24, 2004.

(51) Int. Cl.
*A63F 13/00* (2006.01)

(52) U.S. Cl. ................ 463/20; 463/18; 463/19; 463/21; 273/292

(58) Field of Classification Search .................... 463/16, 463/17, 18, 20, 19
See application file for complete search history.

(56) References Cited

U.S. PATENT DOCUMENTS

| | | | | |
|---|---|---|---|---|
| 5,833,537 | A * | 11/1998 | Barrie | 463/21 |
| 6,347,996 | B1 * | 2/2002 | Gilmore et al. | 463/17 |
| 6,567,718 | B1 | 5/2003 | Campbell et al. | |
| 6,602,137 | B2 * | 8/2003 | Kaminkow et al. | 463/16 |
| 7,708,628 | B2 * | 5/2010 | Baerlocher | 463/17 |
| 7,731,581 | B2 * | 6/2010 | Chamberlain et al. | 463/19 |
| 2002/0174384 | A1 | 11/2002 | Graichen et al. | |
| 2003/0199307 | A1 * | 10/2003 | DeMar et al. | 463/20 |
| 2003/0224851 | A1 * | 12/2003 | Gilmore | 463/20 |
| 2004/0082374 | A1 * | 4/2004 | Maya et al. | 463/16 |
| 2004/0082376 | A1 * | 4/2004 | Baerlocher et al. | 463/16 |
| 2004/0162132 | A1 | 8/2004 | Jaffe et al. | 463/20 |
| 2005/0003886 | A1 * | 1/2005 | Englman et al. | 463/25 |

FOREIGN PATENT DOCUMENTS

JP 08261886 A 10/1996

OTHER PUBLICATIONS

PCT/ISA/237.

* cited by examiner

*Primary Examiner* — Paul A D'Agostino
*Assistant Examiner* — Ankit Doshi
(74) *Attorney, Agent, or Firm* — Nixon Peabody LLP

(57) ABSTRACT

A gaming machine (10) for conducting a wagering game comprises a value input device (16) for receiving a wager from a player and a display (26) for displaying a first plurality of locations in a first formation and a second plurality of locations in a second formation. The second plurality of locations is associated with the first plurality of locations. A processor is operative to select at least one first location from the first plurality of locations to yield a first outcome, select at least one second location from the second plurality of locations to yield a second outcome, combine the first and second outcomes to yield a combined outcome, and provide an award based on the combined outcome.

15 Claims, 19 Drawing Sheets

WAGERING GAME WITH ASSOCIATED OUTCOMES

CROSS-REFERENCE TO RELATED APPLICATIONS

This application is a U.S. national phase of International Application No. PCT/US2005/033839, filed Sep. 21, 2005, which claims the benefit of priority of U.S. Provisional Patent Application No. 60/613,171, filed Sep. 24, 2004, both of which are incorporated by reference in their entirety.

FIELD OF THE INVENTION

The present invention relates generally to gaming terminals for playing a wagering game and, more particularly, to a gaming terminal for playing a wagering game with associated outcomes.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines, available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

SUMMARY OF THE INVENTION

In one embodiment, a gaming machine for conducting a wagering game comprises a value input device for receiving a wager from a player and a display for displaying a first plurality of locations in a first formation and a second plurality of locations in a second formation. The second plurality of locations is associated with the first plurality of locations. A processor is operative to select at least one first location from the first plurality of locations to yield a first outcome, select at least one second location from the second plurality of locations to yield a second outcome, combine the first and second outcomes to yield a combined outcome, and provide an award based on the combined outcome. A method for conducting a wagering game on a gaming machine is also disclosed.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1:
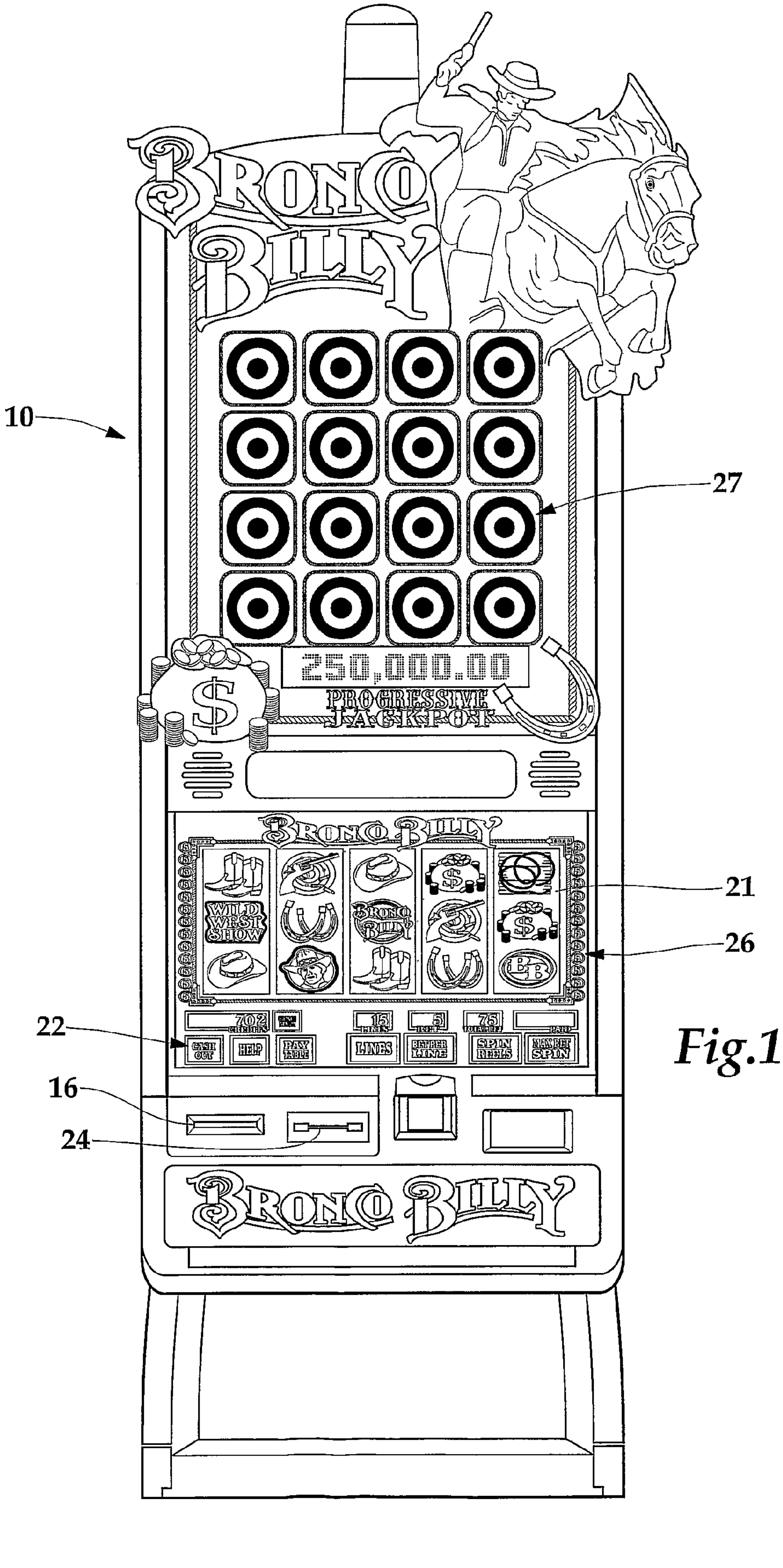
FIG. 1 is a perspective view of a video gaming terminal according to one embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

FIG. 1 shows a perspective view of a typical gaming terminal 10 used by gaming establishments, such as casinos. With regard to the present invention, the gaming terminal 10 may be any type of gaming terminal and may have varying structures and methods of operation. For example, the gaming terminal 10 may be a mechanical gaming terminal configured to play mechanical slots, or it may be an electromechanical or electrical gaming terminal configured to play video slots or a video casino game, such as blackjack, slots, keno, poker, etc.

As shown, the gaming terminal 10 includes input devices, such as a wager acceptor 16, a touch screen 21, a push-button panel 22, and an information reader 24. For outputs, the gaming terminal 10 includes a payout mechanism 23 (see FIG. 2), a main display 26 for displaying information about the basic wagering game, and a secondary display 27 that may display a bonus feature or portion thereof, an electronic version of a pay table, and/or also possibly game-related information or other entertainment features. While these typical components found in the gaming terminal 10 are described below, it should be understood that numerous other elements may exist and may be used in any number of combinations to create various forms of a gaming terminal.

The wager acceptor 16 may be provided in many forms, individually or in combination. The wager acceptor 16 may include a coin slot acceptor or a note acceptor to input value to the gaming terminal 10. The wager acceptor 16 may include a card-reading device for reading a card that has a recorded monetary value with which it is associated. The wager acceptor 16 may also receive a card that authorizes access to a central account, which can transfer money to the gaming terminal 10.

Also included is the payout mechanism 23, which performs the reverse functions of the wager acceptor. For example, the payout mechanism 23 may include a coin dispenser or a note dispenser to output value from gaming terminal 10. Also, the payout mechanism 23 may also be adapted to receive a card that authorizes the gaming terminal to transfer credits from the gaming terminal 10 to a central account.

The push button panel 22 is typically offered, in addition to the touch screen 21, to provide players with an option on how to make their game selections. Alternatively, the push button panel 22 provides inputs for one aspect of operating the game, while the touch screen 21 allows for inputs needed for another aspect of operating the game. By way of example, a "$" button may be pressed to insert money to increase a player's credits. A "Collect" button may be touched to collect winnings. A "Pay Table" button may be touched to see the game's pay table. A "Select Lines" button may be touched to change the number of pay lines bet. A "Bet Per Line" button may be touched to change the amount of credits bet on each line. The number of lines to play is generally selected prior to selecting the amount to bet per line. A "Spin Reels" button may be touched to begin the game. A "Stop Reels" button may be touched to stop the reels while they are spinning. If the player does not touch the "Stop Reels" button, the reels will stop on their own. A "Max Bet Spin" button may be touched to play the maximum credits instantly.

A "Change Denom" button may be touched to change denomination. When a player initiates a gaming session, the machine may default either to (1) the lowest available denomination (e.g., penny if the available denominations are penny, nickel, dime, quarter, and dollar), (2) the denomination used in the immediately prior gaming session, (3) the denomination set by an operator as the default, or (4) the favorite or most profitable denomination determined by the gaming terminal 10 based on history of play on the terminal. Regarding (4), the terminal may consider the total history of play or just recent history such as a fixed number of recent plays or plays that occurred in the last day, week, or month.

The outcome of the basic wagering game is displayed to the player on the main display 26. The main display 26 may take the form of a cathode ray tube (CRT), a high resolution LCD, a plasma display, an LED display, or any other type of video display suitable for use in the gaming terminal 10. As shown, the main display 26 includes the touch screen 21 overlaying the entire monitor (or a portion thereof) to allow players to make game-related selections. Alternatively, the gaming terminal 10 may have a number of mechanical reels to display the game outcome, as well.

In some embodiments, the information reader 24 is a card reader that allows for identification of a player by reading a card with information indicating his or her true identity. Currently, identification is used by casinos for rewarding certain players with complimentary services or special offers. For example, a player may be enrolled in the gaming establishment's players' club and may be awarded certain complimentary services as that player collects points in his or her player-tracking account. The player inserts his or her card into the player-identification card reader 24, which allows the casino's computers to register that player's wagering at the gaming terminal 10. The information reader 24 may also include a keypad (not shown) for entering a personal identification number (PIN). The gaming terminal 10 may require that the player enter their PIN prior to obtaining information. The gaming terminal 10 may use the secondary display 27 for providing the player with information about his or her account or other player-specific information. Also, in some embodiments, the information reader 24 may be used to restore assets that the player achieved during a previous game session and had saved.

Figure 2:
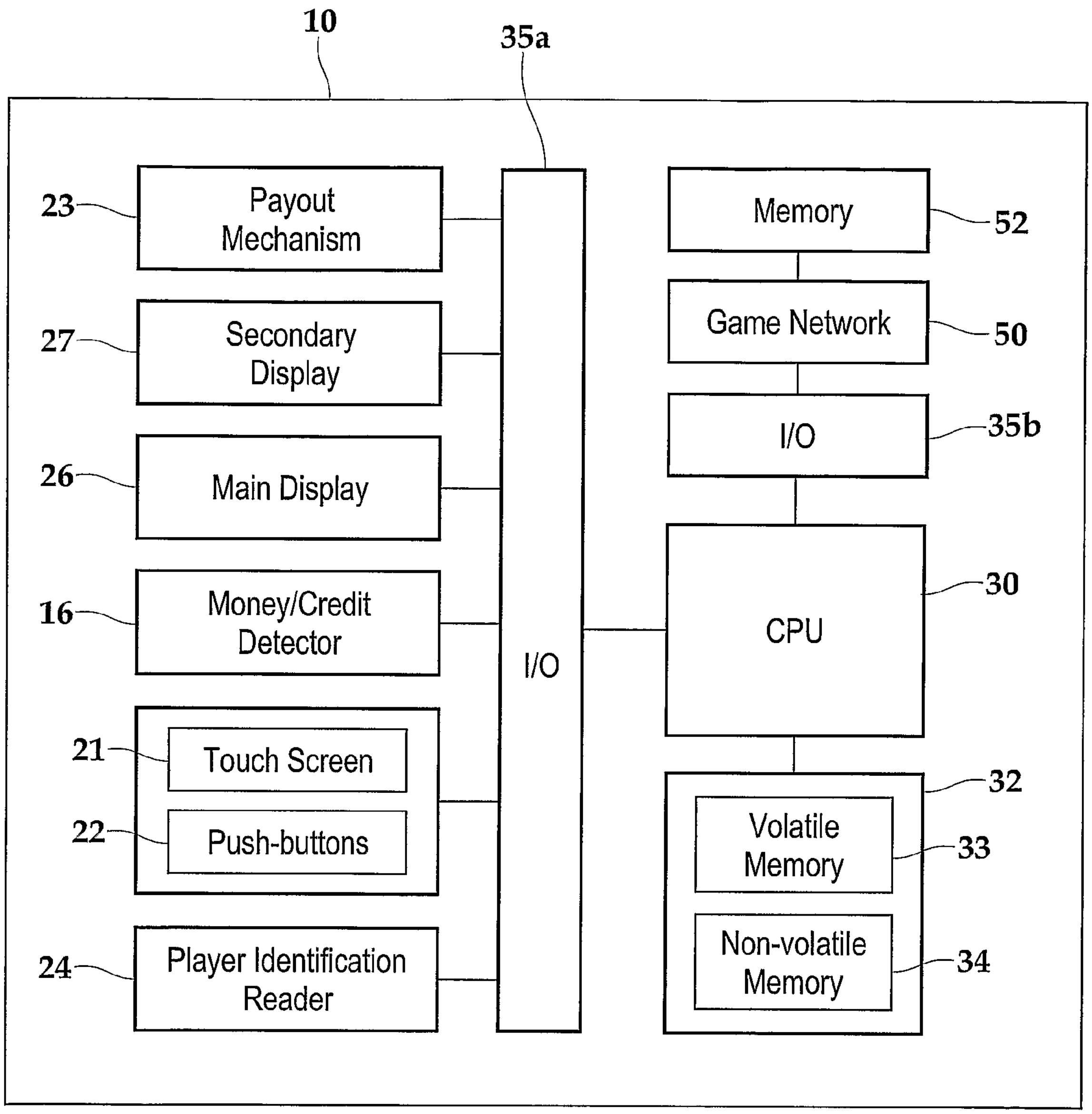
FIG. 2 is a block diagram of the gaming terminal of FIG. 1.

As shown in FIG. 2, the various components of the gaming terminal 10 are controlled by a central processing unit (CPU) 30 (such as a microprocessor or microcontroller). To provide the gaming functions, the CPU 30 executes a game program that allows for the randomly-selected outcome. The CPU 30 is also coupled to or includes a local memory 32. The local memory 32 may comprise a volatile memory 33 (e.g., a random-access memory (RAM)) and a non-volatile memory 34 (e.g., an EEPROM). It should be appreciated that the CPU 30 may include one or more microprocessors. Similarly, the local memory 32 may include multiple RAM and multiple program memories.

Communications between the peripheral components of the gaming terminal 10 and the CPU 30 occur through input/output (I/O) circuits 35*a*. As such, the CPU 30 also controls and receives inputs from the peripheral components of the gaming terminal 10. Further, the CPU 30 communicates with external systems via the I/O circuits 35*b*. Although the I/O circuits 35 may be shown as a single block, it should be appreciated that the I/O circuits 35 may include a number of different types of I/O circuits.

In some embodiments, the CPU 30 may not be inside the gaming terminal 10. Instead, the CPU 30 may be part of a game network 50 and may be used to control numerous gaming terminals 10. In these embodiments, the CPU 30 will run the basic games for each of the gaming terminals 10, and may also be used to link the gaming terminals 10 together. The game network 50 can include progressive jackpots that are contributed to by all or some of the gaming terminals 10 in the network (e.g., terminal-level jackpots that only each terminal 10 contributes to, bank-level jackpots that are contributed to by all of the terminals 10 in a particular bank, and wide-area jackpots that are contributed to by a larger number of terminals 10, such as multiple banks). Alternatively, the game network 50 can allow the player to retrieve assets obtained while playing one terminal 10 at a different gaming terminal that is also part of the game network. Assets may be any number of things, including, but not limited to, monetary or non-monetary awards, features that a player builds up in a bonus or progressive game to win awards, etc.

Figure 3:
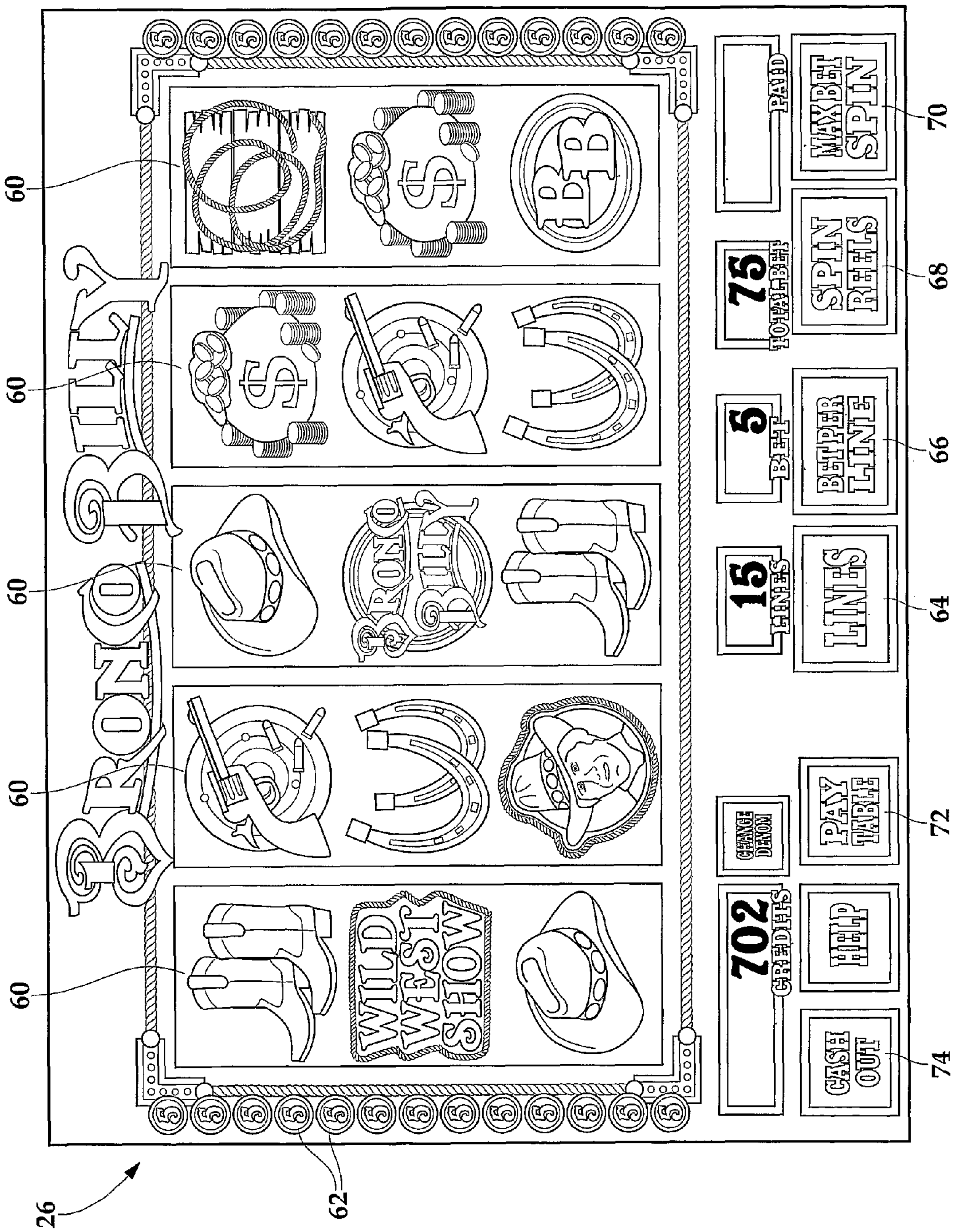
FIG. 3 is a display image showing the reels symbols of a basic slot game.

Referring to FIG. 3, the basic game is implemented on the video display 26 on five simulated reels 60 with a number of pay lines 62. Each of the pay lines 62 extends through one symbol on each of the reels 60. Generally, game play is initiated by inserting money or playing a number of credits, causing the CPU to activate a number of pay lines corresponding to the amount of money or number of credits played. In one embodiment, the player selects the number of pay lines to play by pressing a "Select Lines" key 64 on the display 26. The player then chooses the number of coins or credits to bet on the selected pay lines by pressing the "Bet Per Line" key 66.

After activation of the pay lines, the reels 60 may be set in motion by touching the "Spin Reels" key 68 or, if the player wishes to bet the maximum amount per line, by using the "Max Bet Spin" key 70. Alternatively, other mechanisms such as, for example, a lever or push button may be used to set the reels 60 in motion. The CPU uses a random number generator to select a game outcome (e.g., "basic" game outcome) corresponding to a particular set of reel "stop positions." The CPU then causes each of the video reels 60 to stop at the appropriate stop position. Video symbols are displayed on the reels 60 to graphically illustrate the reel stop positions and indicate whether the stop positions of the reels represent a winning game outcome.

Figure 4:
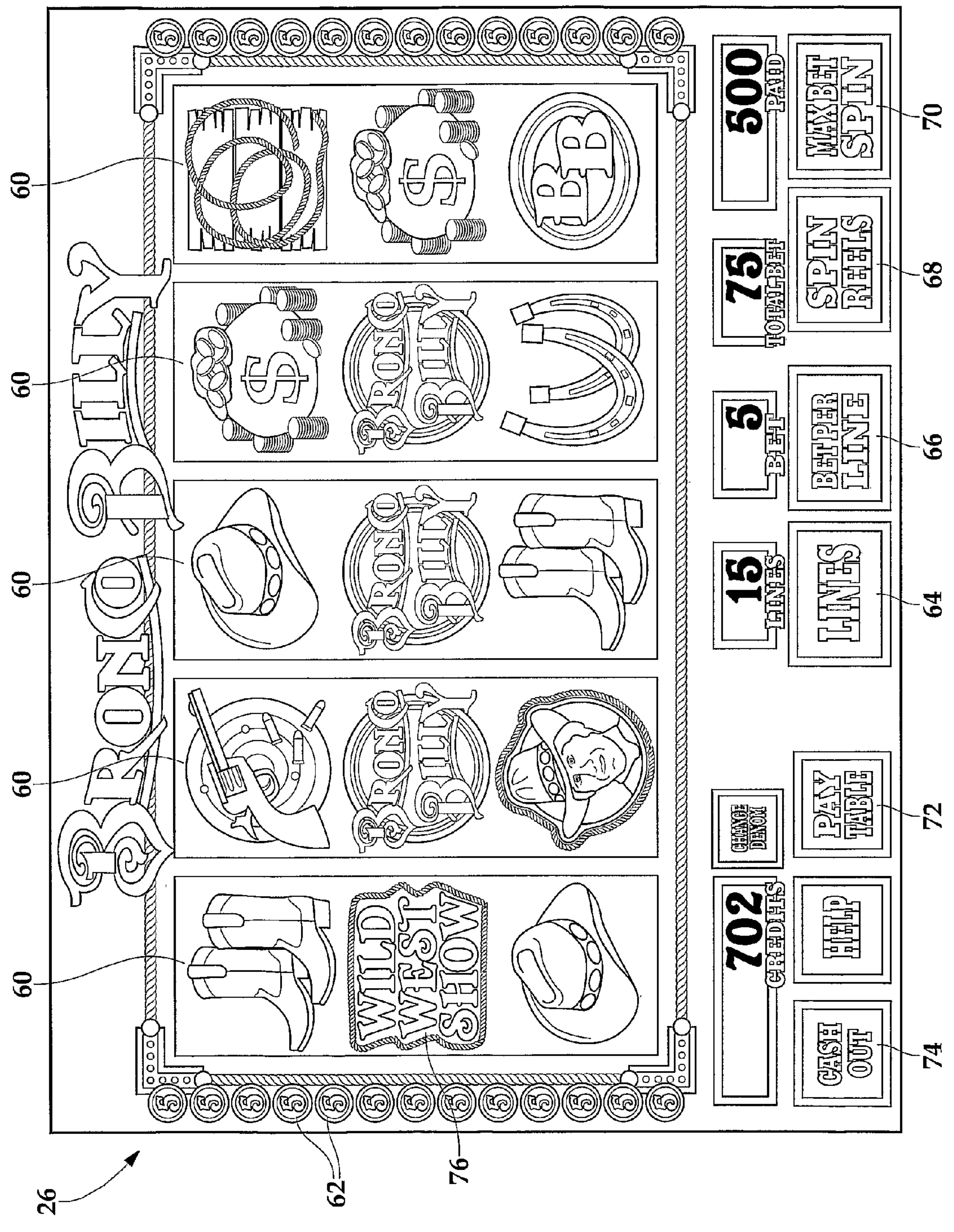
FIG. 4 is a display image showing a winning combination of reel symbols including a wild WILD WEST SHOW symbol.

Winning basic game outcomes (e.g., symbol combinations resulting in payment of coins or credits) are identifiable to the player by a pay table. In one embodiment, the pay table is affixed to the gaming terminal and/or displayed by the video display 26 in response to a command by the player (e.g., by pressing the "Pay Table" key 72). A winning basic game outcome occurs when the symbols appearing on the reels 60 along an active pay line correspond to one of the winning combinations on the pay table. A winning combination, for example, could be three or more matching symbols along an active pay line, where the award is greater as the number of matching symbols along the active pay line increases. A winning combination may be formed with one or more wild symbols that substitute for other reel symbols. For example, in FIG. 4 there is shown a winning combination of four BRONCO BILLY symbols where a wild WILD WEST SHOW symbol 76 acts as one of the BRONCO BILLY symbols. If the displayed symbols stop in a winning combination, the game credits the player an amount corresponding to the award in the pay table for that combination multiplied by the amount of credits bet on the winning pay line. The player may collect the amount of accumulated credits by pressing the "Collect" or "Cash Out" key 74. In one implementation, the winning combinations start from the leftmost reel and span adjacent reels. In an alternative implementation, the winning combinations start from either the leftmost reel or the rightmost reel and span adjacent reels.

Included among the plurality of basic game outcomes are one or more start-feature outcomes for triggering play of respective bonus features. A start-feature outcome may be defined in any number of ways. For example, a start-feature outcome occurs when a special start-feature symbol or a special combination of symbols appears on one or more of the reels 60. The start-feature outcome may require the combination of symbols to appear along an active pay line, or may alternatively require that the combination of symbols appear anywhere on the display (i.e., scattered) regardless of whether the symbols are along an active pay line. The appearance of a start-feature outcome causes the CPU to shift operation from the basic game to the bonus feature associated with that outcome.

Figure 5:
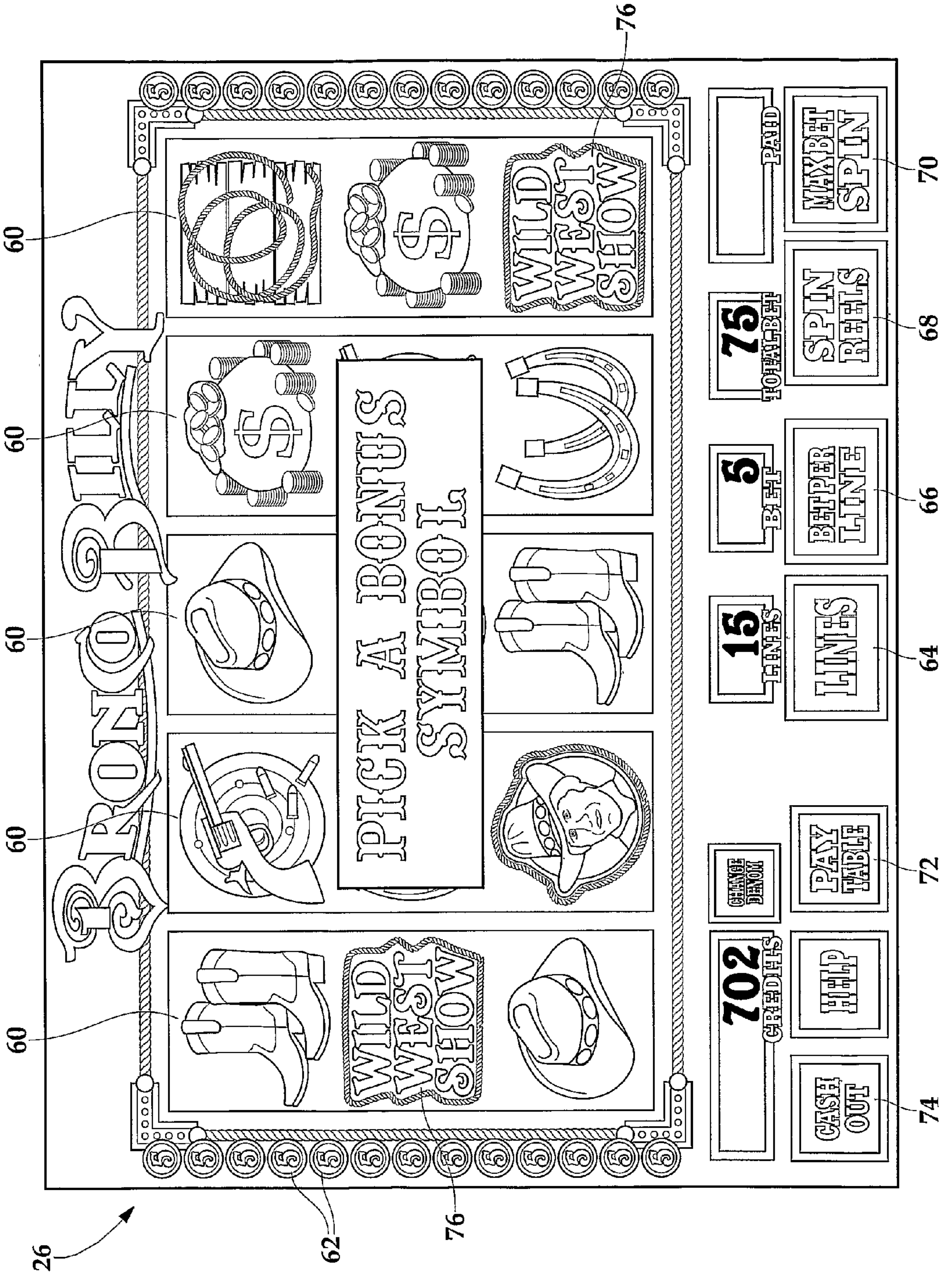
FIG. 5 is a display image showing a combination of reel symbols for triggering a Wild West Show bonus feature.

Referring to FIG. 5, the appearance of a WILD WEST SHOW symbol 76 anywhere on both the leftmost and rightmost reels during the basic game triggers the Wild West Show Bonus feature. The player is prompted to select one of the two triggering symbols 76.

Figure 6:
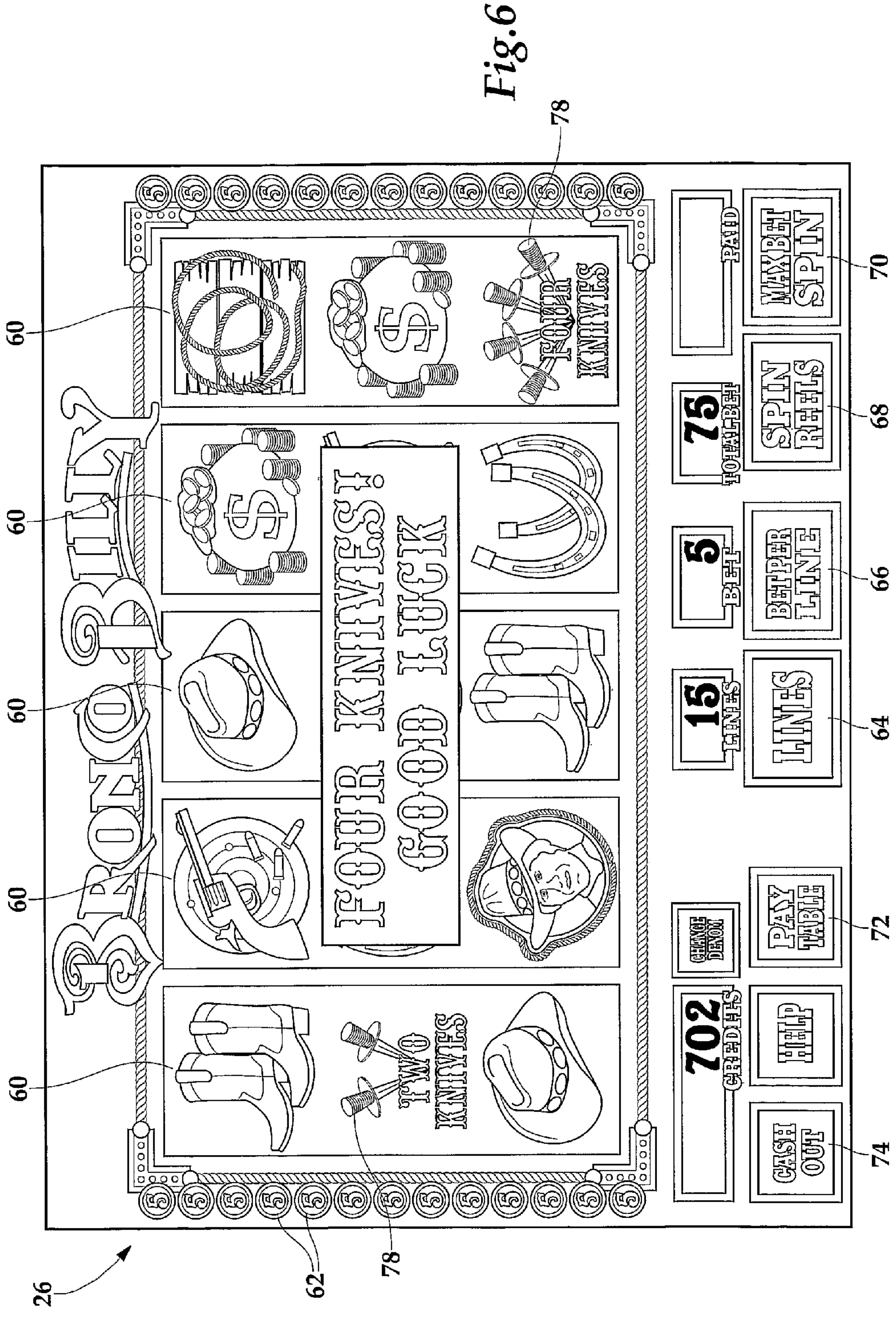
FIGS. 6 through 10 are display images associated with the WILD WEST SHOW bonus feature.

Referring to FIG. 6, the selected symbol reveals either two or four bonus knives 78. In the illustrated example, the player has selected the symbol on the rightmost reel and is awarded four bonus knives 78.

Figure 7:
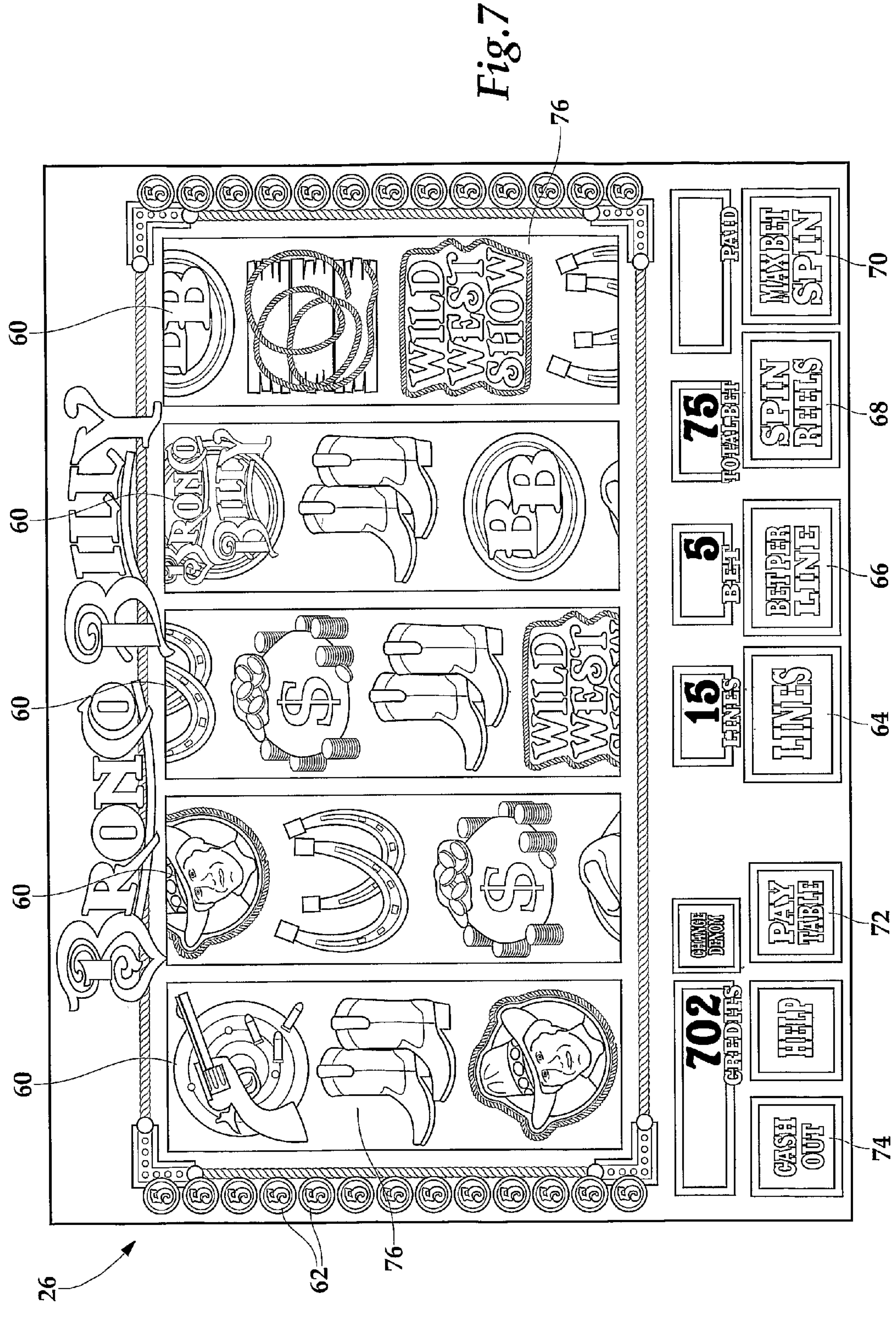

Referring to FIG. 7, the player is then awarded one free spin of the reels 60.

Figure 8:
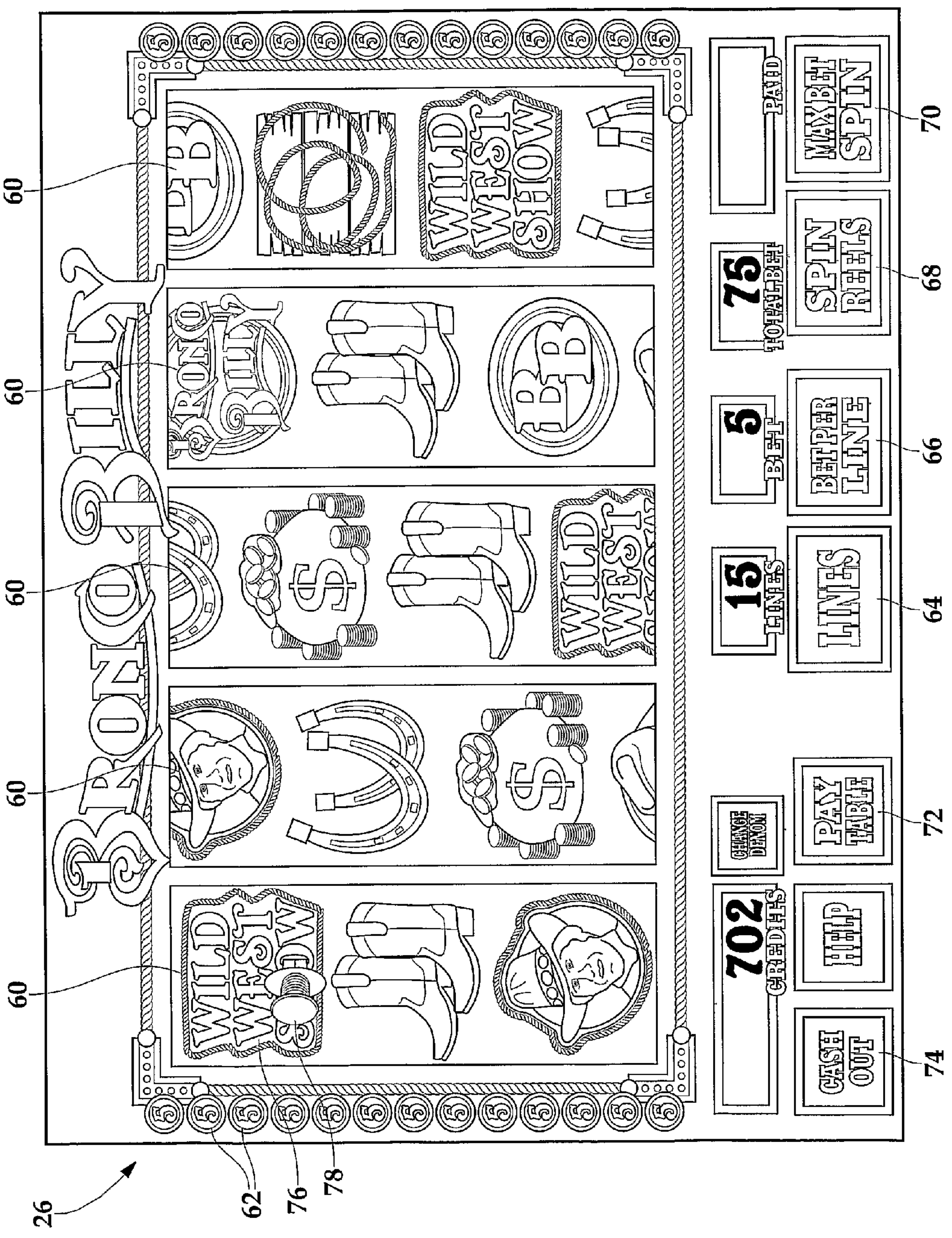

Referring to FIG. 8, Bronco Billy will randomly throw the four bonus knives 78 at the WILD WEST SHOW symbols 76 as the reels spin, stopping them in place as the other reels continue.

Figure 9A:
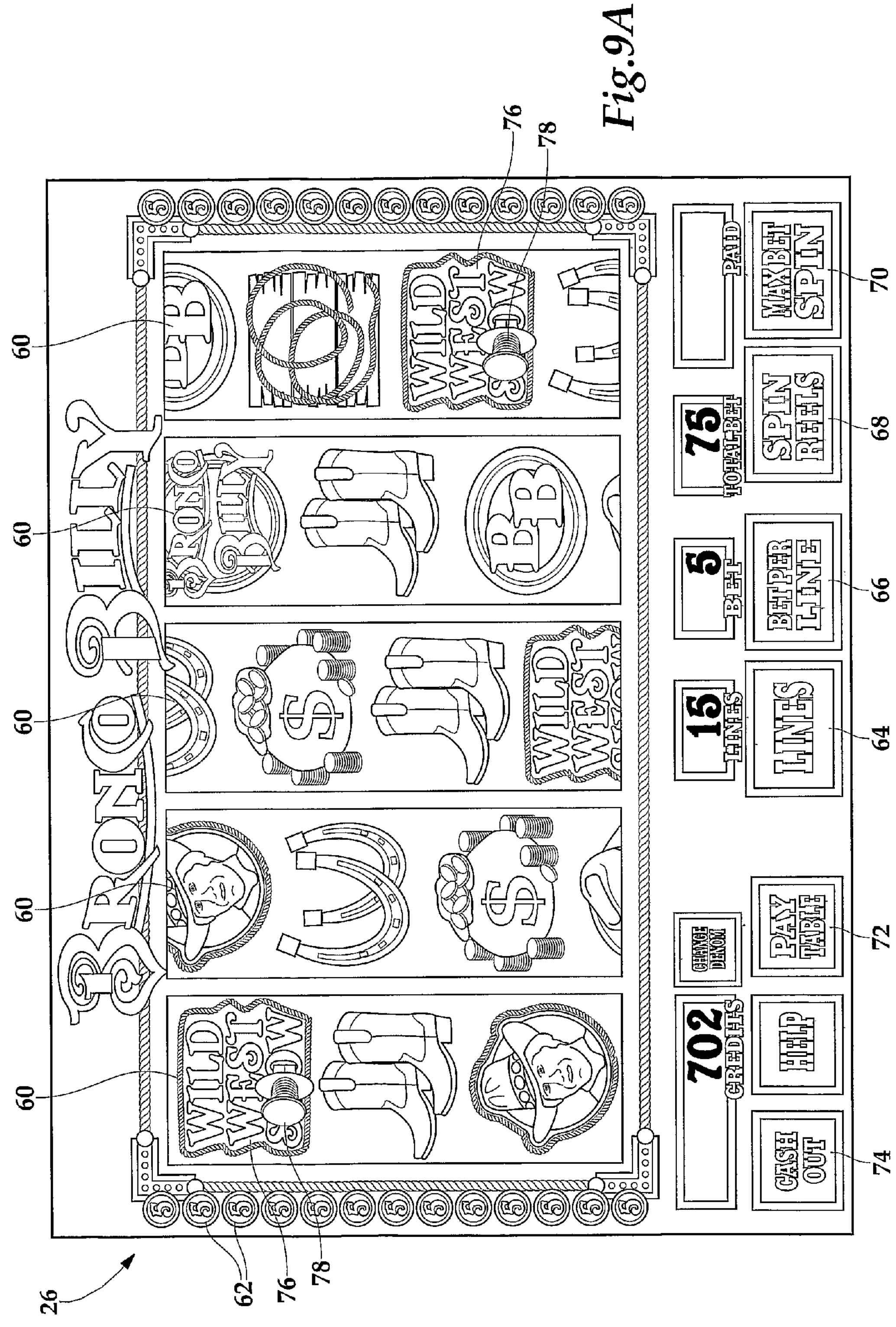
Figure 9B:
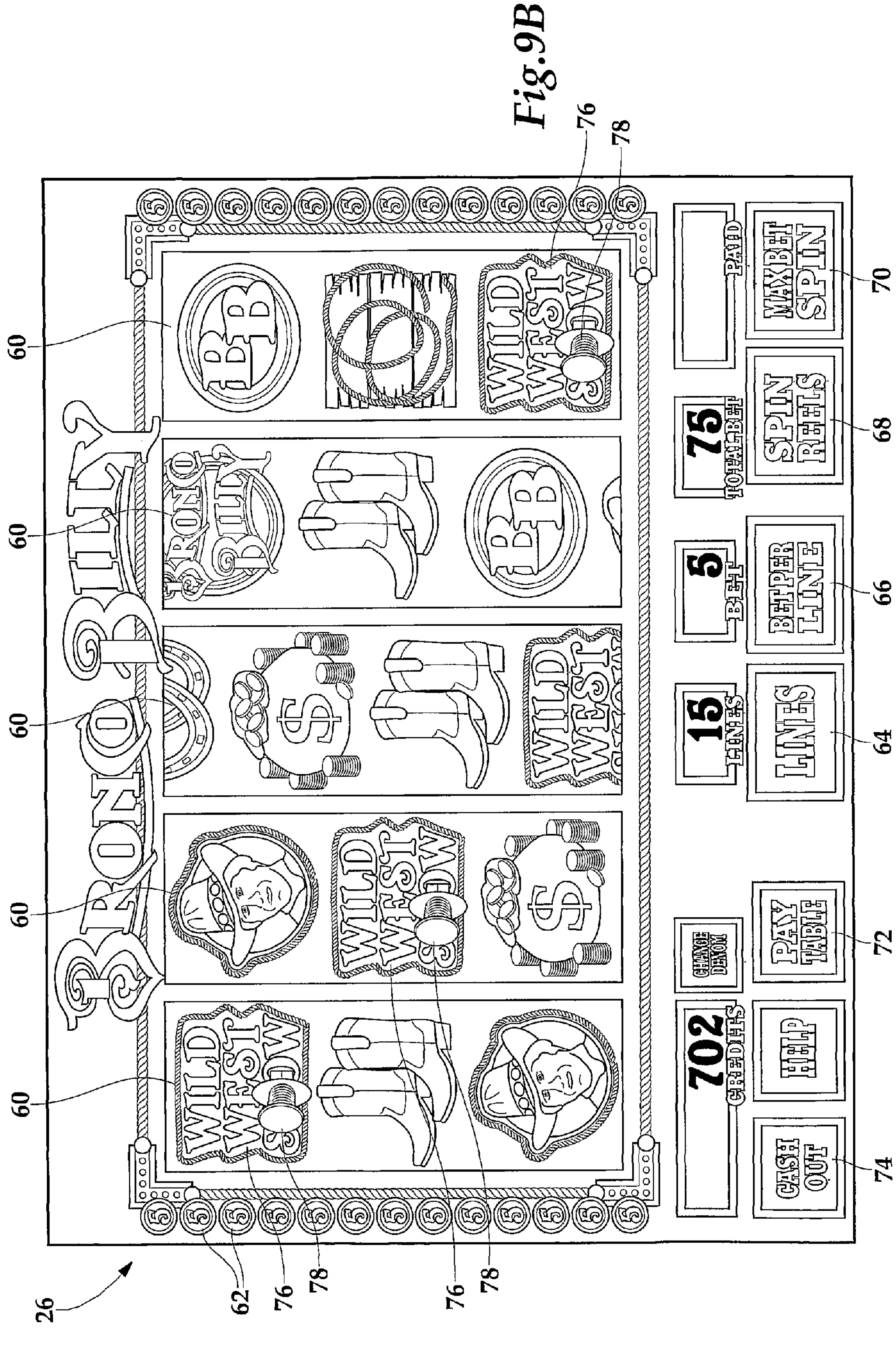
Figure 9C:
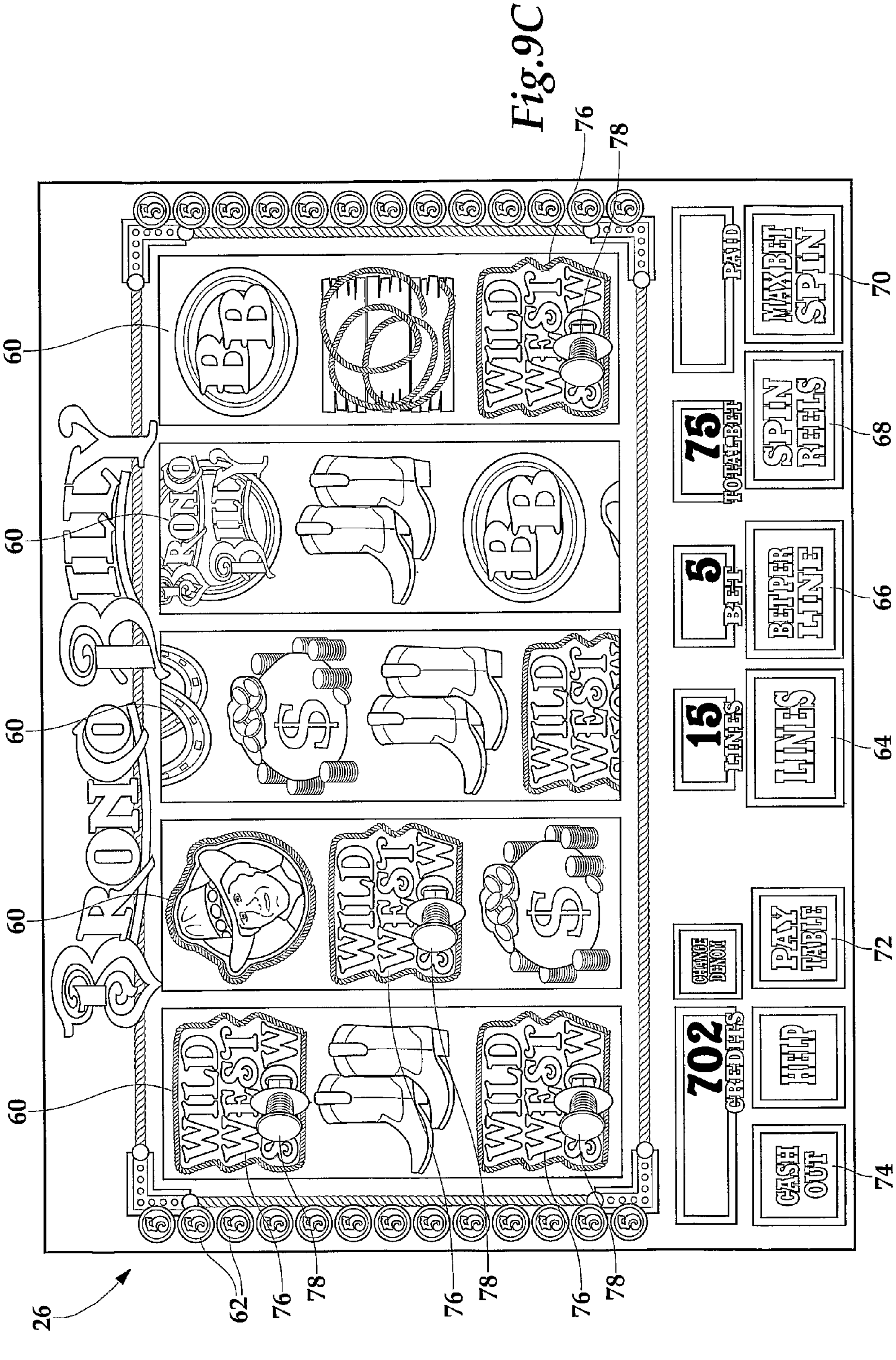

Referring to FIGS. 9(*a*), 9(*b*) and 9(*c*), one by one the WILD WEST SHOW symbols 76 are stopped.

Figure 10:
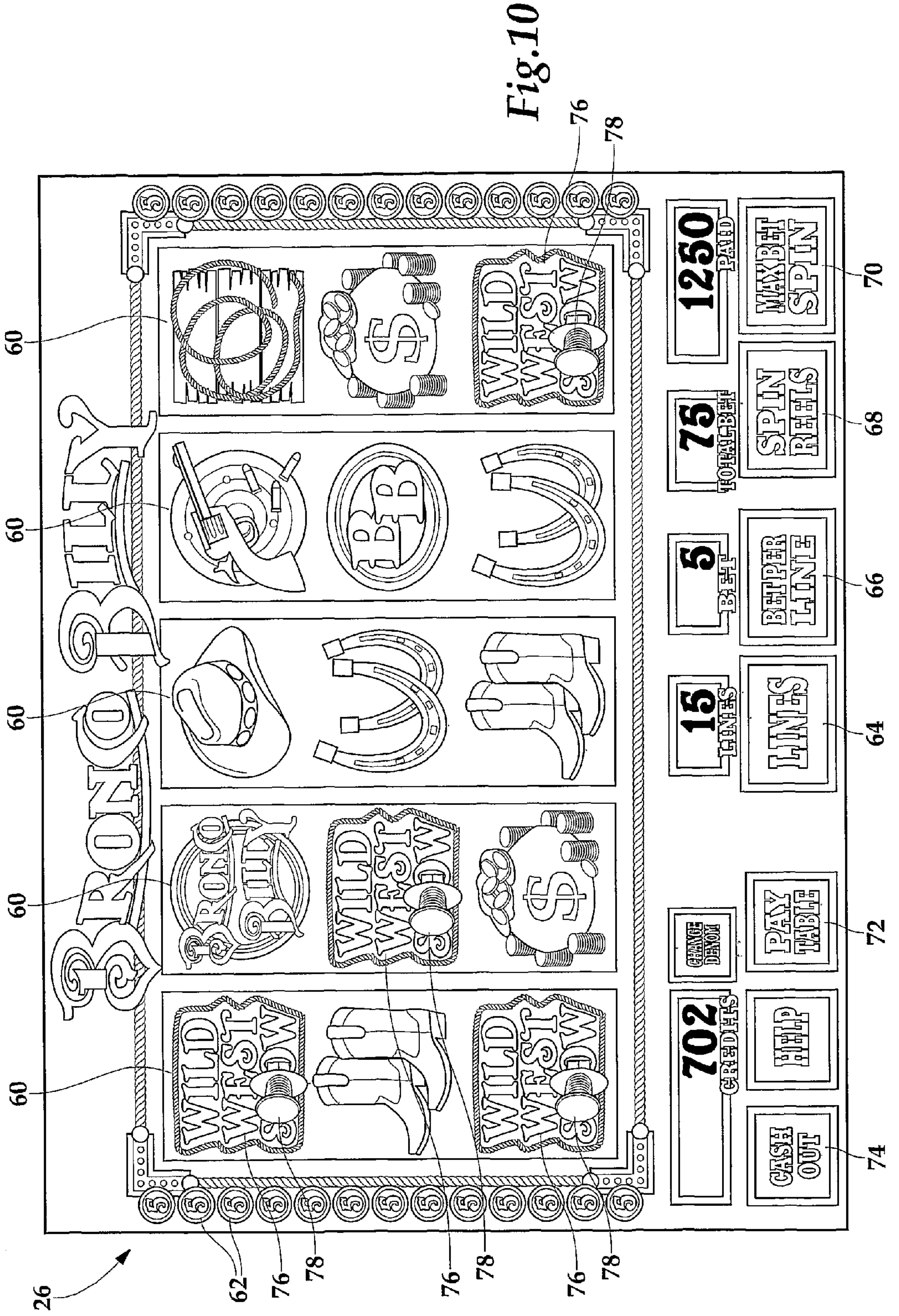

Referring to FIG. 10, when the reels stop, the player is awarded for all winning combinations along active pay lines 62 with the WILD WEST SHOW symbols 76 evaluated as wilds. After the conclusion of the Wild West Show bonus feature, the CPU shifts operation back to the basic slot game.

Figure 11:
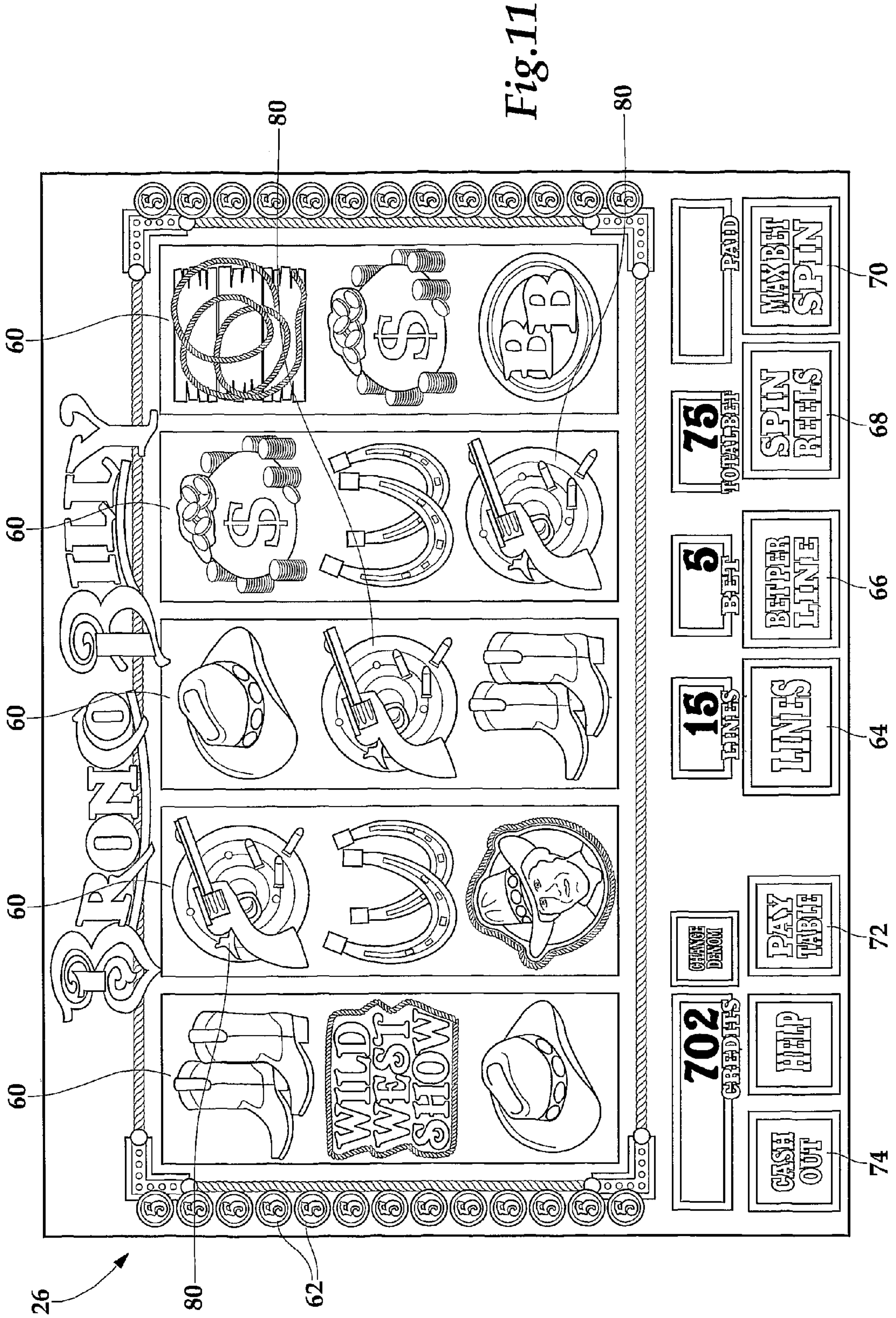
FIG. 11 is a display image showing a combination of reel symbols for triggering Bronco Billy's Sharpshooter bonus feature.

Referring to FIG. 11, the appearance of three or more SIX SHOOTER symbols 80 anywhere on the reels during the basic game triggers Bronco Billy's Sharpshooter bonus feature.

Figure 12:
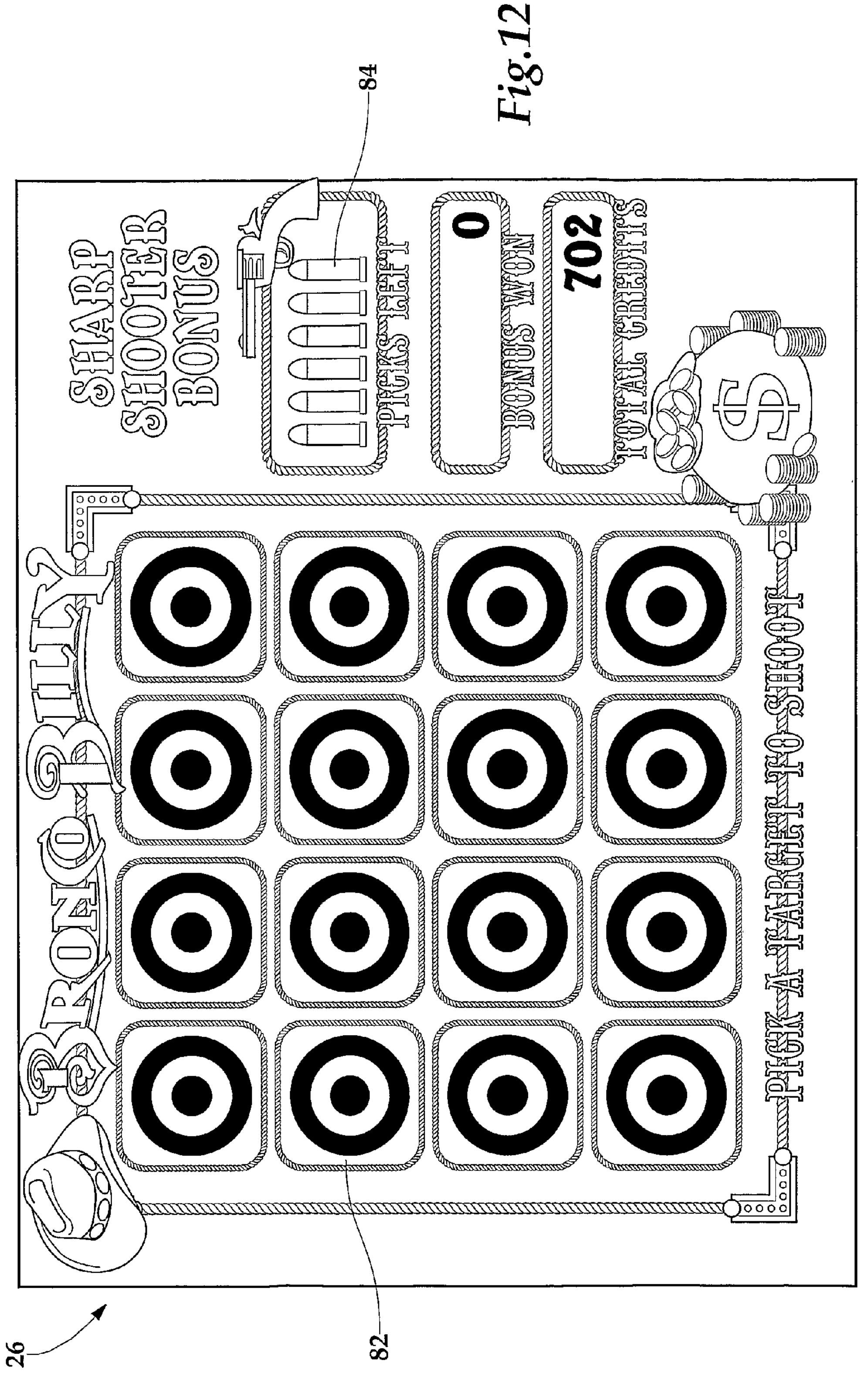
FIGS. 12 through 17 are display images and top box representations associated with Bronco Billy's Sharpshooter bonus feature.

Referring to FIG. 12, the image on the main display 26 transitions to show a matrix of targets 82. In the illustrated example, the matrix is a 4×4 grid. The player is awarded six bullets 84 to "shoot" (i.e., select) the targets 82 by touching them on the display.

Figure 13:
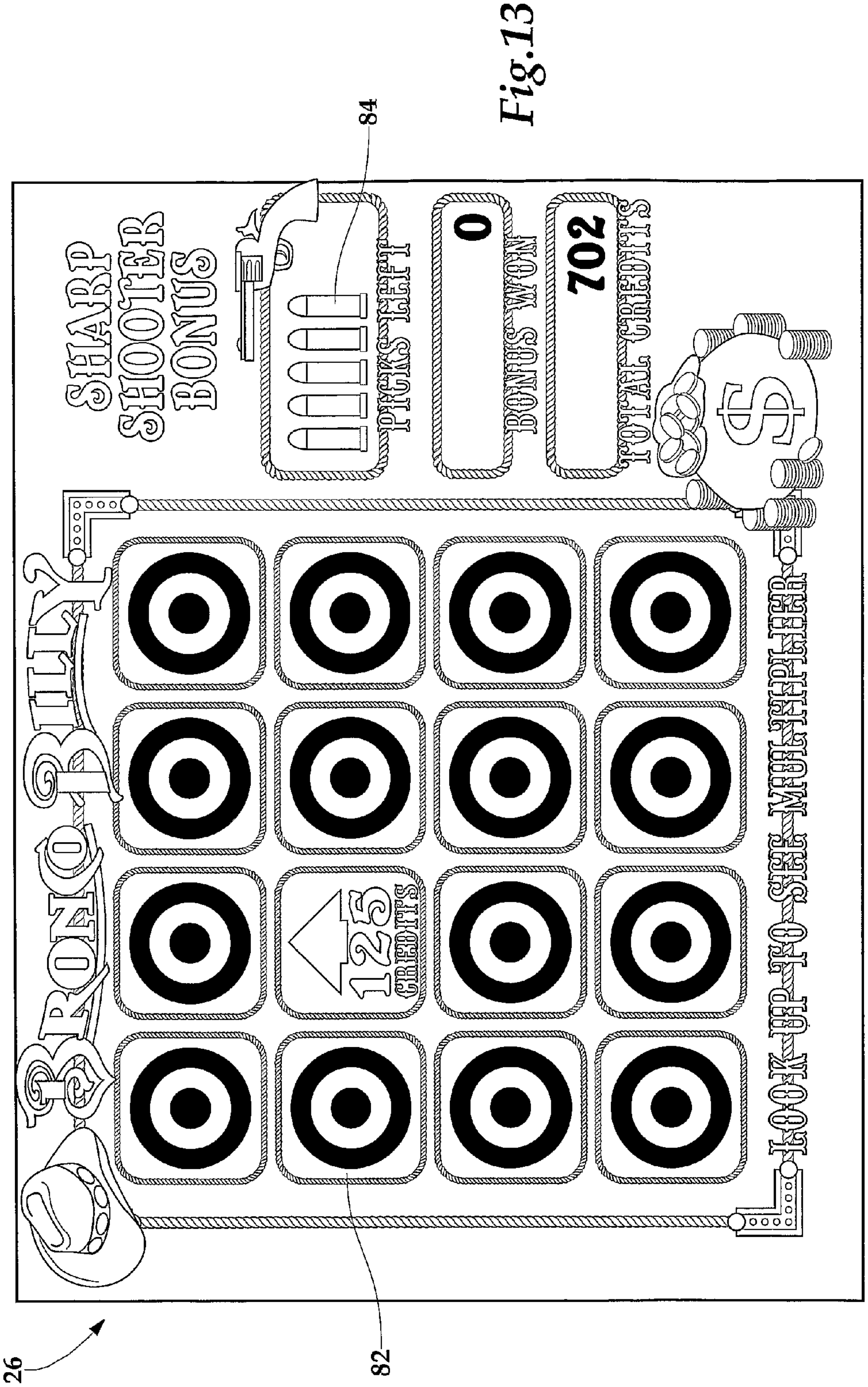

Referring to FIG. 13, with each selection the player is presented an outcome in the form of a credit amount and prompted to look at the secondary display 27 (see FIGS. 1 and 14) in the gaming terminal's top box. In the illustrated example, the player is presented a credit amount of 125 credits.

Figure 14:
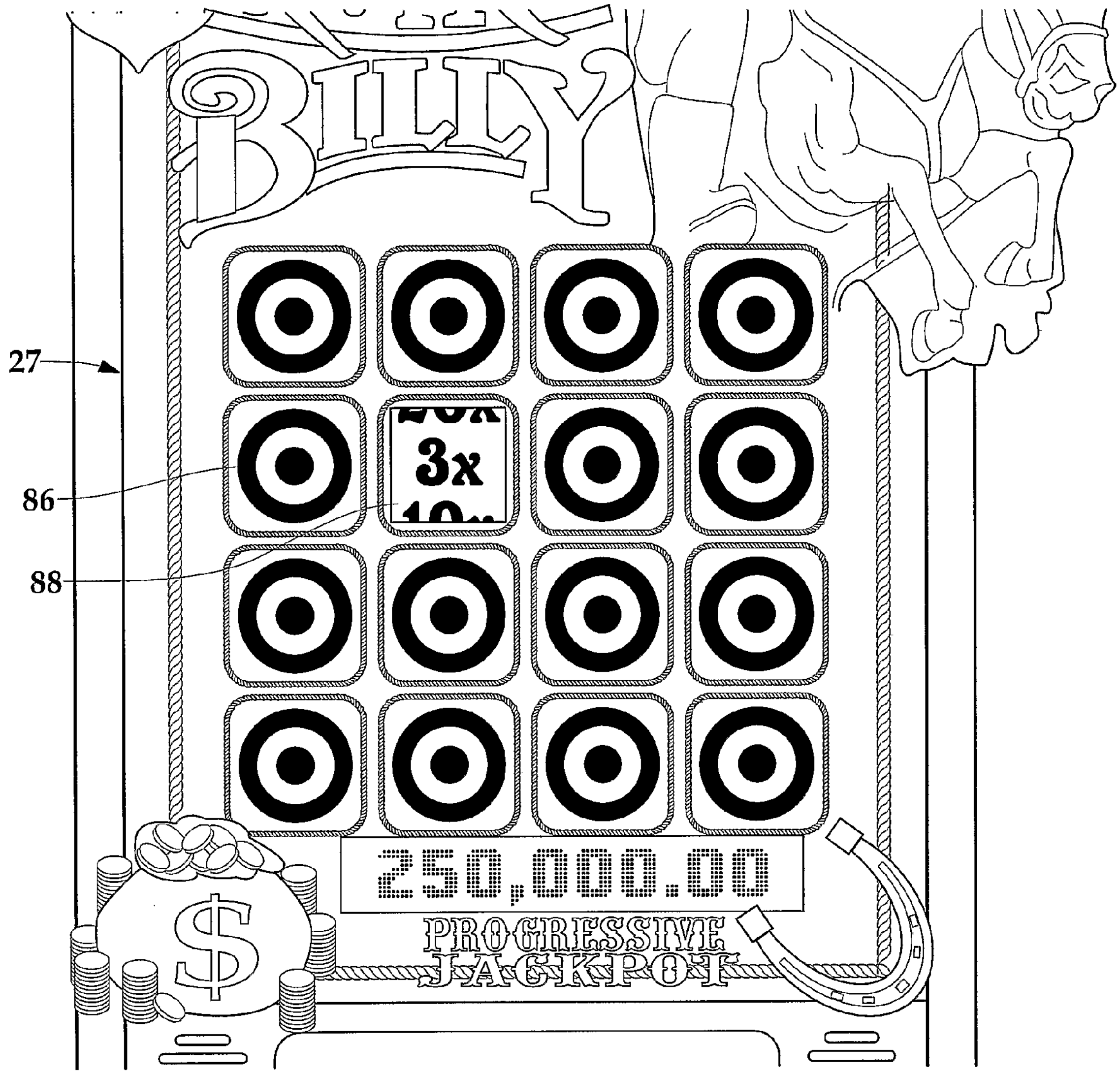

Referring to FIG. 14, the secondary display 27 includes a matching matrix of targets 86. The target 86 in the same relative position in its matrix as the target 82 selected by the player on the main display 26 is "shot out" (i.e., opened), revealing a mini-reel 88 with multipliers ranging from 2× to 25×. The target 86 may be in the form of a mechanical door that opens to reveal the mini-reel 88, which may be implemented as a mechanical or video reel. Alternatively, both the target 86 and the mini-reel 88 may be implemented in video such that the image of the target 86 transitions to the image of the mini-reel 88. All of the targets 86 and mini-reels 88 may be implemented with a single large video display, or with separate video displays for each matrix position.

Figure 15:
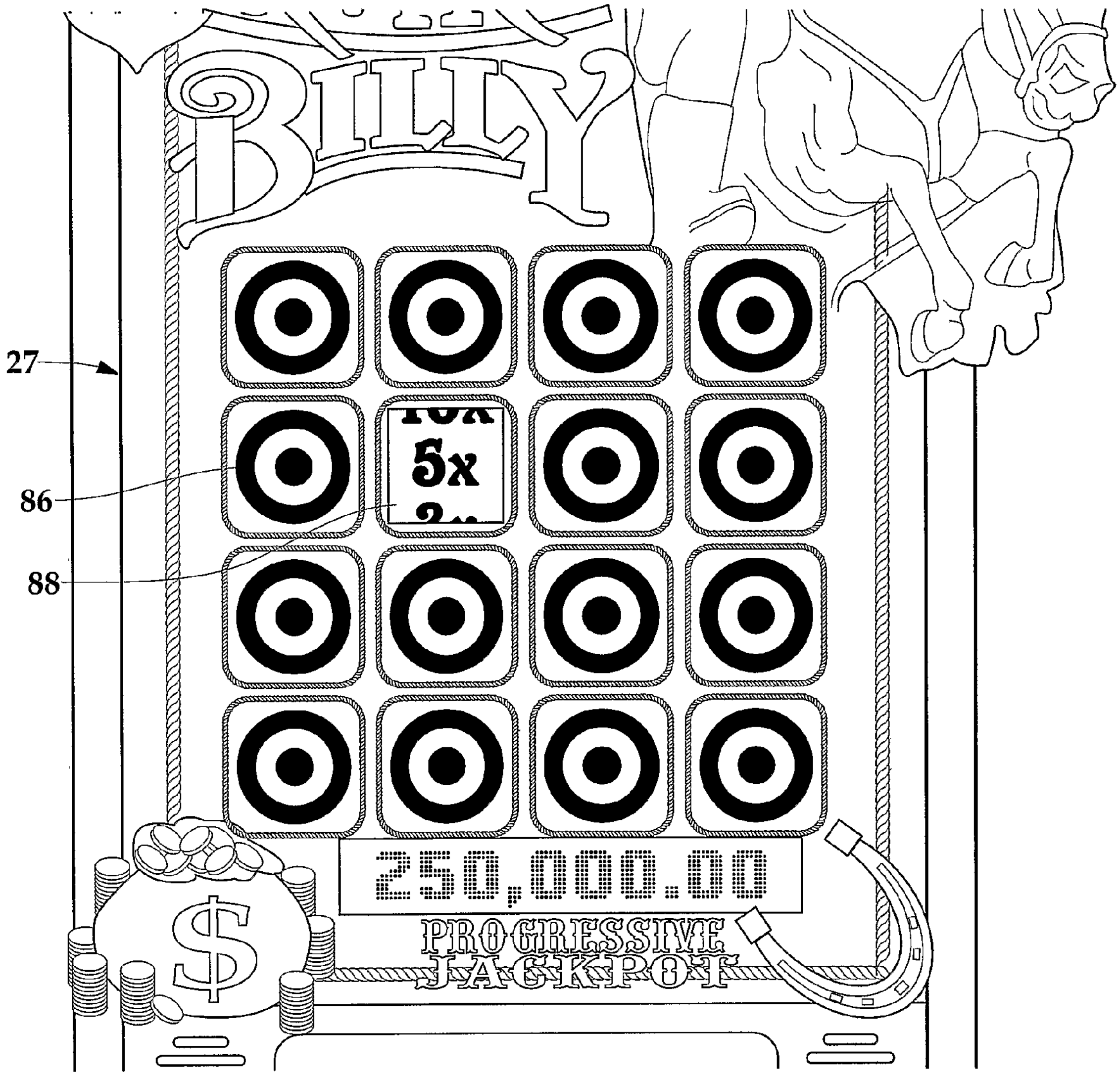

Referring to FIG. 15, the mini-reel 88 then spins and stops on an outcome in the form of a multiplier. In the illustrated example, the mini-reel 88 stops on a 5× multiplier.

Figure 16:
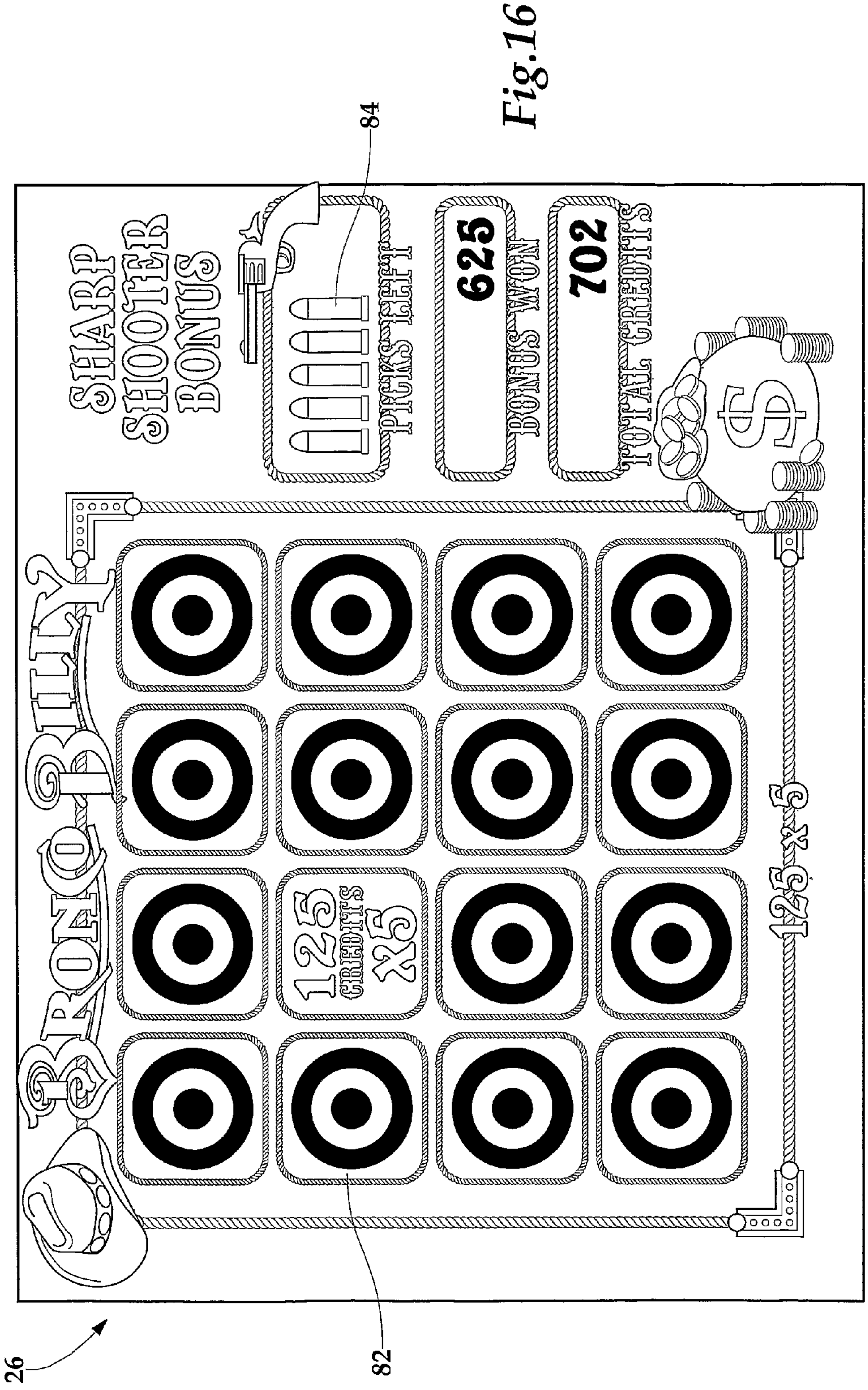

Referring to FIG. 16, the outcome on the secondary display 27 (see FIG. 15) is applied to the selected outcome on the main display 26 so as to enhance the selected outcome on the main display 26. More specifically, the player is awarded the credit amount multiplied by the multiplier. In the illustrated example, the player is awarded 625 credits, which equals the credit amount of 125 credits multiplied by the 5× multiplier. The player then continues selecting the targets 82 until there are no bullets 84 remaining. In an alternative embodiment, the outcomes on the respective displays 26, 27 may be reversed such that the selected outcome on the main display 26 is a multiplier, while the outcome on the secondary display 27 is a credit amount. In another alternative embodiment, the outcomes on the respective displays 26, 27 are additive or somehow combined. For example, the outcomes could be in the form of non-numeric symbols such that the combined symbols represent an award, e.g., based on a pay table that associates the combined symbols with a payoff amount.

Figure 17:
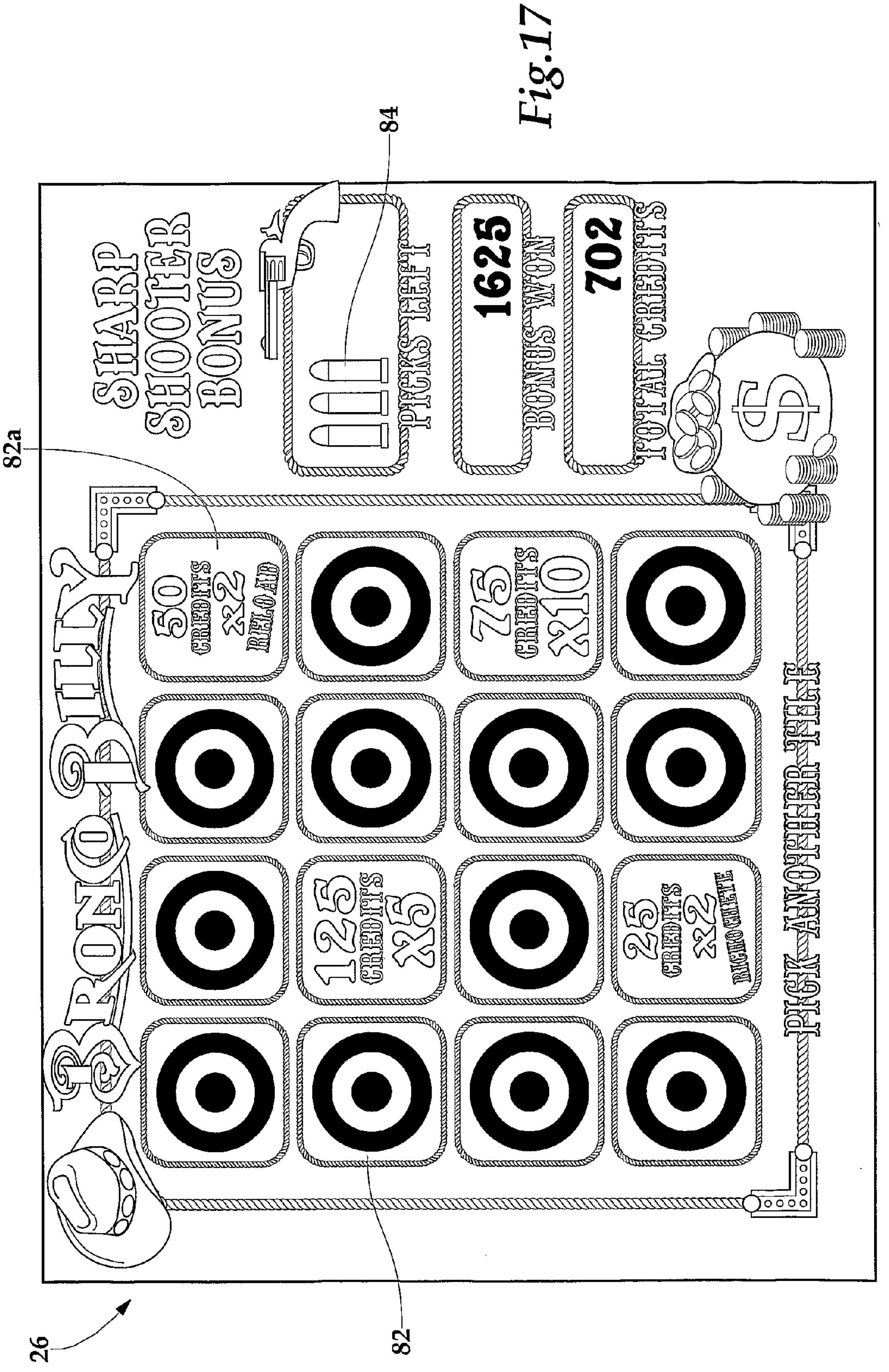

Referring to FIG. 17, if the player selects a re-load target 82*a* before running out of bullets 84, then the player is awarded six additional bullets 84. Furthermore, "ricochet" targets will randomly shoot additional targets with the same bullet 84, creating multiple wins. After the conclusion of Bronco Billy's Sharpshooter bonus feature, the CPU shifts operation back to the basic slot game.

While the present invention has been described with reference to one or more particular embodiments, those skilled in the art will recognize that many changes may be made thereto without departing from the spirit and scope of the present invention, For example, in Bronco Billy's Sharpshooter bonus feature, the selections of the targets 82 on the main display 26 could be made by the CPU without player input, or could be determined through extended game play with or without player input. Further, the matrices on both the main display 26 and the secondary display 27 could have a different number of rows or columns or could be replaced with a non-rectangular formation altogether where locations on one of the formations correspond to respective locations on the other formation. Other formations could, for example, include a circle, ellipse, triangle, or other polygonal shape where the selectable locations are only along the periphery (e.g., like a trail or board game) or, in addition to the periphery, fill the shape. Each of these embodiments and obvious variations thereof is contemplated as falling within the spirit and scope of the claimed invention, which is set forth in the following claims.

What is claimed is:

1. A method for conducting a wagering game on a gaming machine, comprising:

receiving a wager from a player via a player input device;

displaying, on one or more displays, a plurality of first locations in a first formation, each of the first locations having a single associated symbol, and a plurality of second locations in a second formation, each of the second locations initially corresponding to a respective assigned one of the first locations;

selecting at least one first location from the plurality of first locations, the first location yielding a first outcome;

automatically selecting the second location corresponding to the selected first location, the second location yielding a second randomly determined outcome;

wherein the first outcome includes an award amount and the second outcome includes a multiplier;

combining, via one or more processors, the first and second outcomes to yield a combined outcome; and awarding, via one or more processors, an award based solely on the combined outcome.

2. The method of claim 1, wherein the first and second formations are respective matrices, each matrix including a plurality of rows and columns.

3. The method of claim 1, wherein the first and second formations are each selected from a group consisting of a circle, ellipse, triangle, rectangle, or other polygonal shape, wherein the first plurality of locations occupies only a periphery of the first formation, and wherein the second plurality of locations occupies a periphery of the second formation.

4. The method of claim 1, wherein the first and second formations are each a trail or board game.

5. The method of claim 1, wherein the selecting the first location is responsive to player input.

6. The method of claim 1, wherein a number of first locations in the first formation is equal to a number of second locations in the second formation, and the plurality of first locations and the plurality of second locations are arranged in a substantially similar manner in the respective formations.

7. The method of claim 1, further comprising repeating the selecting, automatically selecting, combining, and awarding until a termination condition occurs.

8. A method for conducting a wagering game on a gaming machine, comprising:

receiving a wager from a player via a player input device;

displaying, on one or more displays, a plurality of first locations in a first formation, each of the first locations having a single associated symbol, and a plurality of second locations in a second formation, each of the second locations initially corresponding to a respective assigned one of the first locations;

selecting at least one first location from the plurality of first locations, the first location yielding a first outcome;

automatically selecting the second location corresponding to the selected first location, the second location yielding a second randomly determined outcome;

combining, via one or more processors, the first and second outcomes to yield a combined outcome;

awarding, via one or more processors, an award based solely on the combined outcome; and wherein the first and second outcomes include respective award amounts, wherein the combining adds the award amounts to yield the award.

9. A method for conducting a wagering game on a gaming machine, comprising:

receiving a wager from a player via a player input device;

displaying, on one or more displays, a plurality of first locations in a first formation and a plurality of second locations in a second formation, each of the second locations initially corresponding to a respective assigned one of the first locations;

selecting first and second locations from respective associated sets of locations to yield respective first and second outcomes, wherein the first outcome includes an award amount and the second outcome includes a multiplier and wherein each of the second locations are automatically selected to correspond to a respective corresponding selected first location;

combining the first and second outcomes to yield a combined outcome via one or more processors; and providing an award based on the combined outcome via one or more processors.

10. The method of claim 9, wherein each set of locations is arranged in a respective array.

11. The method of claim 10, wherein each array includes a plurality of rows and columns.

12. The method of claim 9, wherein the first location is selected in response to player input.

13. A gaming machine for conducting a wagering game, comprising:

a value input device for receiving a wager from a player;

a display for displaying a first plurality of first locations in a first formation and a second plurality of second locations in a second formation, each of the second locations initially corresponding to a respective assigned one of the first locations; and a processor operative to:

select at least one first location from the first plurality of locations to yield a first outcome;

automatically select at least one second location from the second plurality of locations to yield a second outcome, wherein the first outcome includes an award amount and the second outcome includes a multiplier;

combine the first and second outcomes to yield a combined outcome; and provide an award based on the combined outcome.

14. The machine of claim 13, wherein the first and second formations are respective matrices, each matrix including a plurality of rows and columns.

15. The machine of claim 13, wherein the processor is operative to select the first location in response to player input.

* * * * *